United States Patent

Perry et al.

[11] Patent Number: 6,160,489
[45] Date of Patent: Dec. 12, 2000

[54] WIRELESS COMMUNICATION DEVICE ADAPTED TO GENERATE A PLURALITY OF DISTINCTIVE TACTILE ALERT PATTERNS

[75] Inventors: Theresa Sue Perry, Waukesha, Wis.; Pamela Ann Dillard, Lake Zurich, Ill.

[73] Assignee: Motorola, Inc., Schaumburg, Ill.

[21] Appl. No.: 08/264,817

[22] Filed: Jun. 23, 1994

[51] Int. Cl.$^7$ ................................................ H04Q 7/00
[52] U.S. Cl. ................................ 340/825.44; 340/825.46
[58] Field of Search ........................ 340/825.19, 825.44, 340/825.46, 825.47, 825.48, 407.1, 407.2, 311.1; 379/52; 434/112, 114, 116

[56] References Cited

U.S. PATENT DOCUMENTS

| | | | |
|---|---|---|---|
| H1173 | 4/1993 | Davis et al. | 340/825.46 |
| 4,028,502 | 6/1977 | Moricca et al. | 340/407.1 |
| 4,334,280 | 6/1982 | McDonald | 340/407.2 |
| 4,352,091 | 9/1982 | Yamasaki | 340/311.1 |
| 4,421,953 | 12/1983 | Zielinski | 179/2 EC |
| 4,701,759 | 10/1987 | Nadir et al. | 340/825.44 |
| 4,755,816 | 7/1988 | Deluca | 340/825.44 |
| 4,918,438 | 4/1990 | Yamasaki | 340/825.46 |
| 4,922,221 | 5/1990 | Sato et al. | 340/825.47 |
| 5,272,475 | 12/1993 | Eaton et al. | 340/825.44 |
| 5,287,099 | 2/1994 | Tsunoda | 340/825.44 |
| 5,293,161 | 3/1994 | MacDonald | 340/825.44 X |
| 5,307,059 | 4/1994 | Connary et al. | 340/825.44 |
| 5,381,138 | 1/1995 | Stair et al. | 340/825.44 |
| 5,396,229 | 3/1995 | Miyauchi | 340/825.44 |
| 5,422,635 | 6/1995 | Morishima | 340/825.44 |
| 5,495,236 | 2/1996 | Minami | 340/825.44 |

FOREIGN PATENT DOCUMENTS

| | | |
|---|---|---|
| 552484 | 12/1959 | Belgium . |
| 0467071A2 | 6/1991 | European Pat. Off. . |
| 585118 | 2/1994 | European Pat. Off. .......... 340/825.44 |
| 2-27821 | 1/1990 | Japan . |
| 2146153 | 4/1985 | United Kingdom .............. 340/825.44 |
| 2237703 | 5/1991 | United Kingdom .............. 340/825.44 |

OTHER PUBLICATIONS

Rakolta, Pamela A. and Goldenberg, Michael P., "Unique User–Selectable Cadence For Silent Alert Devices", Motorola Technical Developments, vol. 15, May 1992 Schaumberg, US, p. 96.

DeLuca, Mike, "Local Infrared Control of Reciever Alerts", Motorola Technical Developments, vol. 12, Apr. 1991, Schaumburg, US, p. 168.

Bellcore Technical Reference TR–TSY–000219, Issue 2, Nov. 1988, Revision 1, May 1992, "LSSGR LATA Switching Systems Generic Requirements", pp. iii–14.

EIA/TIA Interim Standard, IS–54–B, Apr. 1992, Cellular System Dual–Mode Mobile Station—Base Station Compatibility Standard, pp. i–8, 187–188.

*Primary Examiner*—Michael Horabik
*Attorney, Agent, or Firm*—Kevin D. Kaschke; Sylvia Chen

[57] ABSTRACT

A radiotelephone (101) is adapted to generate a plurality of distinctive vibrating alert patterns. An antenna (201) receives radio frequency (RF) signals including an incoming telephone call signal (121). A receiver (205), operably coupled to the antenna (201), receives the incoming telephone call signal (121). A vibrating alert generator (223) generates a vibrating alert pattern when enabled. A controller (215), operably coupled to the receiver (205) and the vibrating alert generator (223), enables the vibrating alert generator (223) to generate the vibrating alert pattern (301) as one of a plurality of distinctive vibrating alert patterns (301–312) when the incoming telephone call signal (121) is received. The present invention advantageously permits the user or the radiotelephone system (100) to select a preferred distinctive vibrating alert pattern (301), or to assign a particular distinctive vibrating alert pattern (301) to a particular incoming telephone call signal (121).

2 Claims, 4 Drawing Sheets

100

101

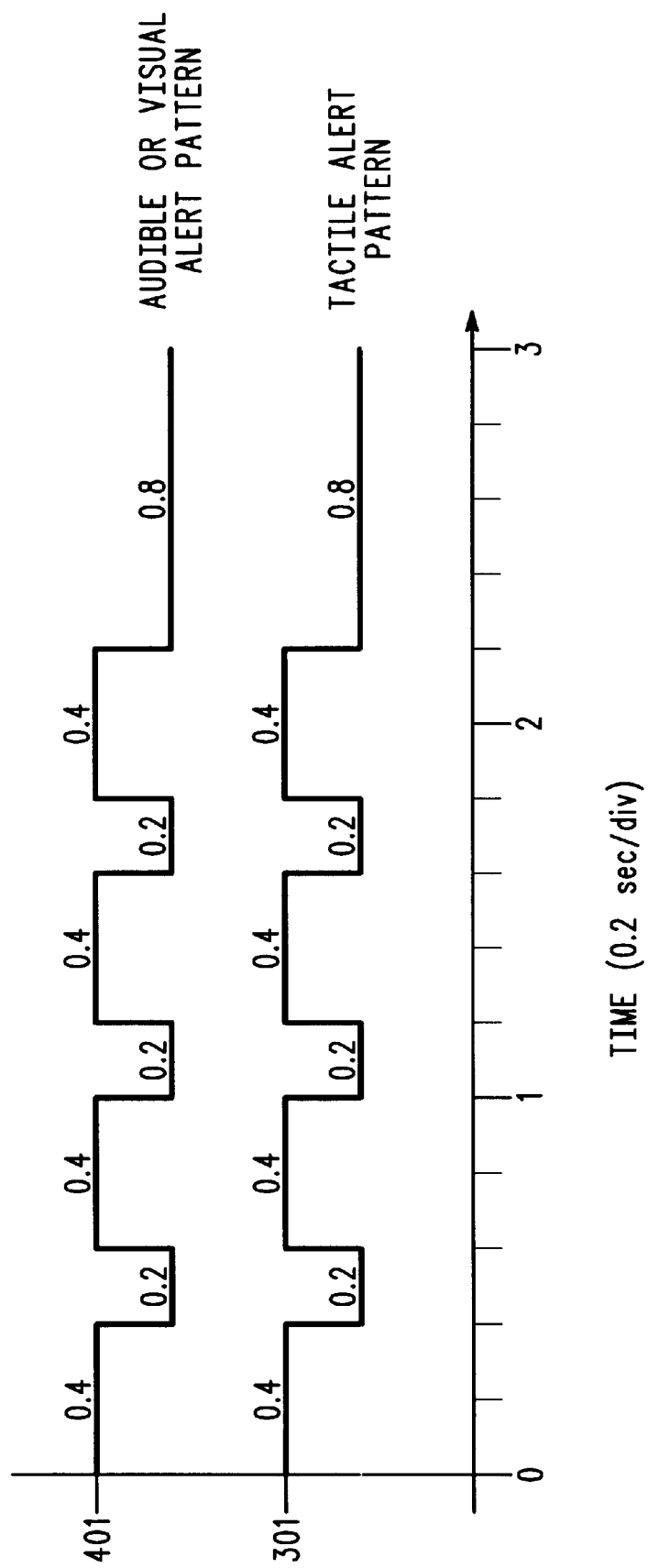

WIRELESS COMMUNICATION DEVICE ADAPTED TO GENERATE A PLURALITY OF DISTINCTIVE TACTILE ALERT PATTERNS

FIELD OF THE INVENTION

The present invention relates generally to wireless communication devices having alert generators and more particularly to a wireless communication device adapted to generate a plurality of distinct tactile alert patterns.

BACKGROUND OF THE INVENTION

A wireless communication device operates in a wireless communication system to provide a user of the device with portable communications. A wireless communication device communicates with the wireless communication system or other wireless communication devices via electromagnetic signals, such as those in the radio frequency (RF) range, for example. The wireless communication device may communicate voice only, data only or both voice and data. The format of the electromagnetic signal communicated between the wireless communication device and the wireless communication system or other devices may be either analog or digital. Examples of wireless communication devices comprise radiotelephones, pagers, two-way radios, personal data assistants, and personal notebooks. The radiotelephones comprise cellular and cordless subscriber units.

Wireless communication devices use various alert techniques to indicate to a user of a wireless communication device that an incoming desired signal has been received. For example, a radiotelephone alerts the user when an incoming call signal is received, and a pager alerts the user when an incoming page signal is received. Generally, these alert techniques include audible, visual and tactile alert generators. The audible alert generator is typically implemented with an acoustic transducer, i.e. a speaker, sometimes known as a ringer. The visual alert generator is typically implemented with a display or a separate indicator. The tactile alert generator is typically implemented with an axially offset counterweight driven by a motor to cause a vibrating sensation.

Audible alert generators are generally known to be implemented in virtually all wireless communication devices. When a desired signal has been received, the wireless communication device activates the audible alert generator to produce a sound, such as a ring or beep, thereby alerting the user. A problem with audible alert generators is that the sound produced can be disturbing to others in environments where there is a low ambient noise level, and may not be heard by the user in environments where there is a high ambient noise level.

In landline telephone systems, landline telephone subscriber units have audible alert generators and can generate distinctive audible alert patterns, such as distinctive ringing or distinctive call-waiting, responsive to signals generated by the landline telephone system. Generally, distinctive ringing and distinctive call-waiting consists of sequenced, variable-length bursts of power ringing interspersed with variable length silent intervals. Distinctive ringing and distinctive call-waiting for landline telephone subscriber units is described in Bellcore's LATA Switching Systems Generic Requirements, Class [SM] Feature: Distinctive Ringing/Call Waiting, FSD 01-01-1110, TR-TSY-000219, Issue 2, November 1988, Revision 1, May 1992.

In a radiotelephone system, radiotelephone subscriber units have audible alert generators and can generate distinctive audible alert patterns, such as distinctive ringing, responsive to alert codes generated by the radiotelephone system. Generally, distinctive ringing in the radiotelephone system is implemented by varying the pitch and cadence or duty cycle, of the audible alert signal. Pitch represents a distinction between tones, usually based on frequency. Cadence or duty cycle is the on/off pattern of the tones. Distinctive ringing for radiotelephone subscriber units is described in EIA/TIA INTERIM STANDARD, Cellular System Dual-Mode Mobile Station-Base Station Compatibility Standard, IS-54-B, Section 2.7.3.1.3.3.1, Telecommunications Industry Association, April 92.

Visual alert generators are generally known to be implemented in most wireless communication devices. When a desired signal has been received, the wireless communication device activates the visual alert generator to produce a visual indicator, such as a flashing icon in the display or a flashing light, thereby alerting the user. A problem with visual alert generators is that the visual indicator produced can go undetected by the user for some period of time until the user actually looks at the visual indicator. Therefore, the audible alert generator is typically used as a primary alert and the visual alert generator is typically used as a secondary or redundant alert.

Tactile alert generators are generally known to be implemented in only some wireless communication devices. Tactile alert generators are typically used in wireless communication devices that are small enough to be portable and worn on the user such that the tactile sensation is felt. Some pagers, for example, have the motor driving the axially offset counter-weight to produce a vibrating sensation against the user. When a desired signal has been received, the wireless communication device activates the tactile alert generator to produce a tactile sensation, such as vibration, thereby alerting the user. A problem with tactile alert generators is that the tactile sensation produced can go undetected by the user when the wireless communication device is not worn by the user or closely coupled to the user in some manner. Another problem with tactile alert generators is that various users may not be responsive to the same tactile sensation produced by the tactile alert generator due to the physiology and clothing of the various users and the location of the wireless communication device on the user's body. Therefore, the tactile alert generator is typically used in environments where the ambient noise level is very low such that others in the area are not disturbed or where the ambient noise level very high such that the user is alerted when the audible alert cannot be heard.

Accordingly, there is a need for a wireless communication device that generates a plurality of distinctive tactile alert patterns.

BRIEF DESCRIPTION OF THE DRAWINGS

FIG. 4 is a timing diagram illustrating a distinctive audible alert pattern and a distinctive silent alert in accordance with the present invention.

DETAILED DESCRIPTION OF THE PREFERRED EMBODIMENT

Figure 1:
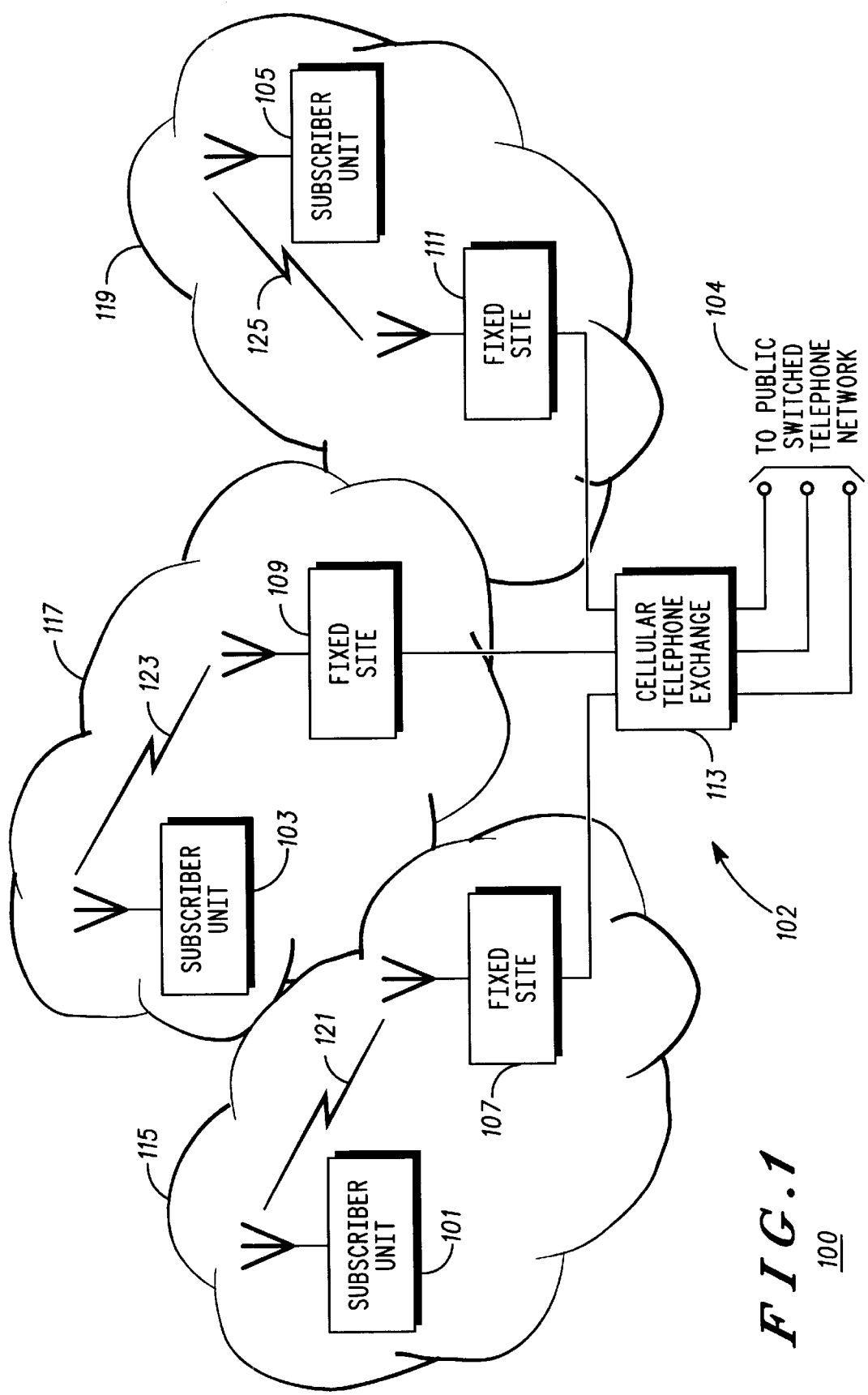
FIG. 1 illustrates a block diagram of a communication system in accordance with the present invention.

FIG. 1 is a block diagram of a communication system 100, in accordance with the present invention. The communication system of FIG. 1 generally comprises a wireless communication system 102 coupled to a wireline communication system 104. The wireless communication system 102 generally comprises a switch 113 coupled to a plurality of fixed sites 107, 109 and 111, and a plurality of wireless communication devices 101, 103 and 105. The communication system 100 provides communications between the wireline communication system 104 and one or more wireless communication devices 101, 103 and 105.

In the preferred embodiment of the present invention, the wireless communication system 102 is a radiotelephone system, and in particular, a cellular radiotelephone system. Alternatively, the wireless communication system 102 may comprise a cordless radiotelephone system, a satellite communication system, a paging system, a trunked radio system or a personal communication system (PCS).

In the preferred embodiment of the present invention, the wireless communication devices 101, 103 and 105 are radiotelephone subscriber units 101, 103 and 105, and in particular, cellular radiotelephone subscriber units. Alternatively, the wireless communication devices 101, 103 and 105 may comprise cordless radiotelephones, pagers, two-way radios, personal data assistants, and personal notebooks. In the preferred embodiment of the present invention, the wireless communication devices 101, 103 and 105 are portable devices that operate in a wireless communication system 102 to advantageously provide users of the devices 101, 103 and 105 with portable communications.

In the preferred embodiment of the present invention, the wireless communication devices 101, 103 and 105 communicate with one of the plurality of fixed sites 107, 109 and 111 via electromagnetic signals 121, 123 and 125, such as those in the radio frequency (RF) range, for example. In the preferred embodiment, the radio frequency signals 121, 123 and 125 are radiotelephone calls transmitted and received by the radiotelephones 101, 103 and 105. The wireless communication devices 101, 103 and 105 may communicate voice only, data only or both voice and data. The format of the electromagnetic signal communicated between the wireless communication devices and the fixed sites 107, 109 and 111 may be either analog or digital. Alternatively, the electromagnetic signals 121, 123 and 125 may be infra-red signals.

In the preferred embodiment of the present invention, each wireless communication device 101, 103 and 105 has a unique telephone directory number, corresponding to the telephone number which would be dialed in the public switched telephone network 104, to access the communications link which would couple the wireless communication device 101, 103 and 105 to the appropriate telephone line.

In the preferred embodiment of the present invention, the fixed sites 107, 109 and 111 are land-base stations. The wireless communication devices 101, 103 and 105 communicate with the fixed sites 107, 109 and 111, which in turn, couple two-way communication through a switch 113. In the preferred embodiment of the present invention, the fixed sites 107, 109 and 111 provide communications, throughout discrete radio coverage areas 115, 117, and 119, respectively, enabling the wireless communication devices 101, 103 and 105 to communicate with the wireless communication system 102 over a wide geographic area. Alternatively, the fixed sites 107, 109 and 111 may comprise satellites orbiting about the earth to communicate either directly with the wireless communication devices 101, 103 and 105 or through other land-base stations.

In the preferred embodiment of the present invention, the switch 113 is a telephone exchange, and in particular, a cellular telephone exchange. Alternatively, the switch 113 may be a cordless telephone exchange such as used in PCS systems. In the preferred embodiment of the present invention, the switch 113 performs the operation of call placement, control, and interconnection with the wireline communication network 104.

In the preferred embodiment of the present invention, the wireline communication network 104 is a public switched telephone network, as is well known in the art.

Generally, the fixed sites 107, 109 and 111, the switch 113 and the wireline communication network 104 are individually well known in the art, and hence no additional description need be provided here except as may be necessary to facilitate the understanding of the present invention.

Figure 2:
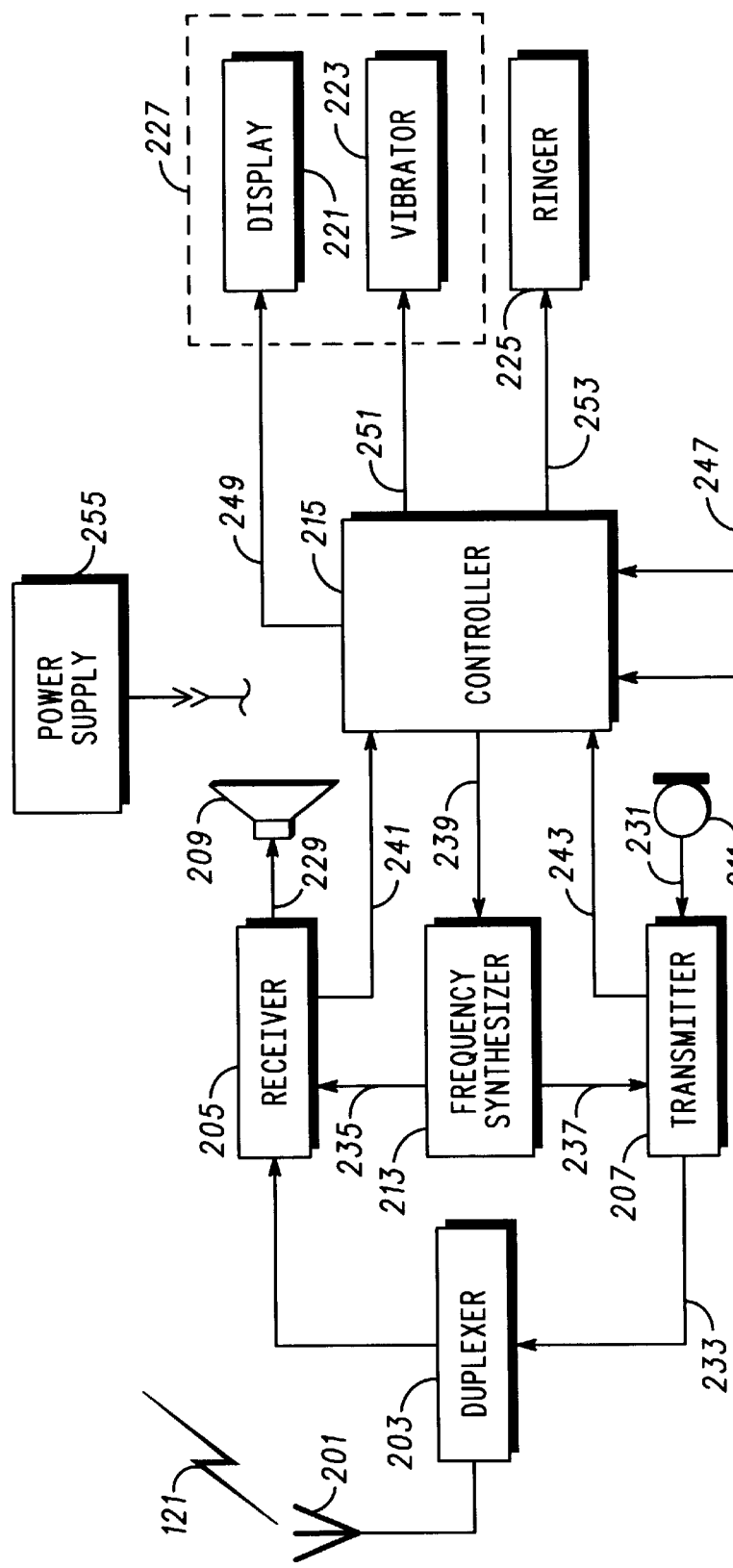
FIG. 2 illustrates a block diagram of a wireless communication device in accordance with the present invention.

FIG. 2 illustrates a block diagram of one of the wireless communication device 101, 103 and 105, such as 101 for example, in accordance with the present invention. The wireless communication device 101, configured as a radiotelephone in the preferred embodiment, generally comprises an antenna 201, a duplexer 203, a receiver 205, a transmitter 207, a speaker 209, a microphone 211, a frequency synthesizer 213, a controller 215, a power supply 255, a keypad 217, a hook switch 219, a silent alert generator 227, and an audible alert generator 225. The silent alert generator 227 may comprise a visual alert generator 221 or a tactile alert generator 223. Generally, the antenna 201, the duplexer 203, the receiver 205, the transmitter 207, the speaker 209, the microphone 211, the frequency synthesizer 213, the controller 215, the power supply 255, the keypad 217, the hook switch 219, the silent alert generator 227, and the audible alert generator 225 are each individually well known in the art, and hence no additional description need be given except as may be necessary to facilitate the understanding of the present invention.

The antenna 201 transmits and receives radio frequency (RF) signals via the duplexer 203. The duplexer 203, coupled to both the transmitter and the receiver, permits RF signals to be transmitted and received at the same time without interfering with one another. The receiver 205 is coupled to the duplexer and is operative to receive a desired signal 121 to produce a received signal at line 229. The speaker 209 is coupled to receive the received signal and operative to generate an acoustic signal for a user of the radiotelephone to hear. The microphone 211 receives an acoustic spoken by the user to produce an input signal at line 231. The transmitter 207 is coupled to receive the input signal at line 231 and operative to produce a transmitted signal at line 233. The frequency synthesizer 213 is coupled to both the receiver 205 and the transmitter 207 and operable to provide frequency reference signals at lines 235 and 237, respectively. The controller 215 is coupled to the frequency synthesizer 213, the receiver 205 and the transmitter 207 and operable to communicate control signals via lines 239, 241 and 243, respectively. The keypad 217 and the hook switch 219 are coupled to the controller 215 and operable to provide input control signals via lines 245 and 247, respectively. The controller 215 is coupled to the silent alert generator 227 and the audible alert generator 225 and operable to provide output control signals via lines 249 and 251, and 253, respectively.

In the preferred embodiment of the present invention, the audible alert generator 225 is a ringer. The audible alert generator 225 is operable to generate an audible alert pattern when enabled by the controller 215 via the output control signal at line 253. When desired signal 121 is received by the receiver 205, the receiver 205 sends the control signal at line 241 to the controller 215. The controller 215 is operable to enable the audible alert generator 225 responsive to the control signal at line 241.

In the preferred embodiment of the present invention, the visual alert generator 221 is a display. The visual alert generator 221 is operable to generate an visual alert pattern when enabled by the controller 215 via the output control signal at line 249. When desired signal 121 is received by the receiver 205, the receiver 205 sends the control signal at line 241 to the controller 215. The controller 215 is operable to enable the visual alert generator 221 responsive to the control signal at line 241.

In the preferred embodiment of the present invention, the tactile alert generator 223 is a vibrator. The tactile alert generator 223 is operable to generate an tactile alert pattern when enabled by the controller 215 via the output control signal at line 251. When the desired signal 121 is received by the receiver 205, the receiver 205 sends the control signal at line 241 to the controller 215. The controller 215 is operable to enable the tactile alert generator 221 responsive to the control signal at line 241.

Power is typically supplied to the wireless communication device 101 via a power supply 255, such as a portable battery, for example. The portable battery permits the wireless communication device 101 to be conveniently carried by the user. The power supply 255 generally supplies power to the elements of the wireless communication device 101 requiring power.

U.S. patent application Ser. No. 07/823,738 discloses subject matter related to the present invention and is herein incorporated by reference.

Figure 3:
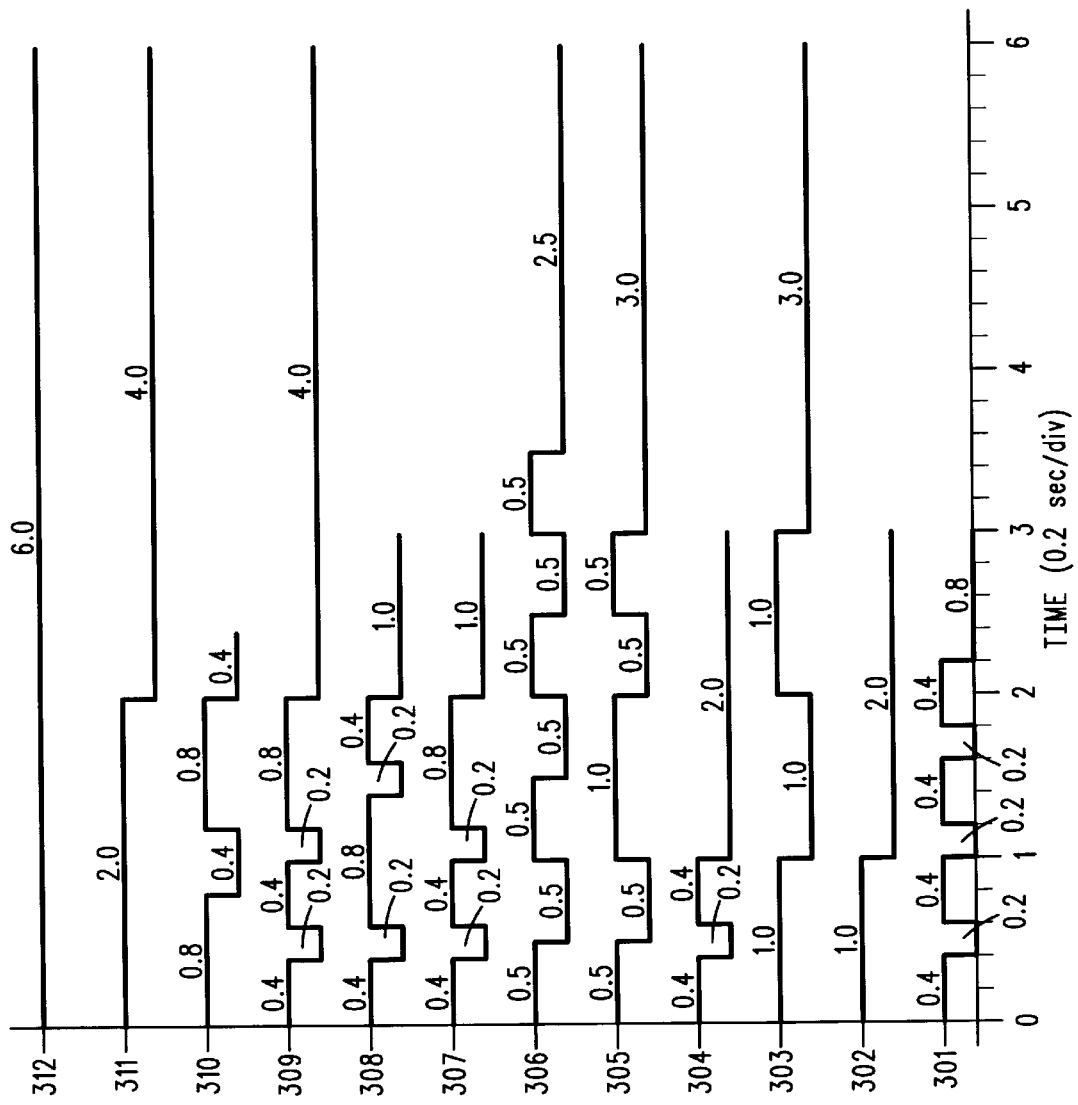
FIG. 3 is a timing diagram illustrating a plurality of distinctive tactile alert patterns in accordance with the present invention.

FIG. 3 is a timing diagram illustrating a plurality of distinctive tactile alert patterns 301–312 in accordance with the present invention. The plurality of distinctive tactile alert patterns 301–312 generated by the tactile alert generator 223 are preferably controlled by the controller 215. A high value signifies that the tactile alert generator 223 is "on", and a low value signifies that the tactile alert generator 233 is "off". However, the plurality of distinctive tactile alert patterns 301–312 generated by the tactile alert generator 223 may also be controlled by the tactile alert generator 223 itself if so desired.

According to the preferred embodiment of the present invention, the receiver 205 receives the desired communication signal 121. The tactile alert generator 223 generates a tactile alert pattern 301 when enabled. The controller 215, operably coupled to the receiver 205 and the tactile alert generator 223, for enabling the tactile alert generator 223 to generate the tactile alert pattern 301 as one of a plurality of distinctive tactile alert patterns 301–312 when the desired communication signal 121 is received.

Generally, the desired communication signal 121 is indicative of an occurrence of a particular event in a radiotelephone system 102 in which the radiotelephone 101 operates. In the preferred embodiment of the present invention, the desired communication signal 121 is an incoming telephone call signal. However, alternate desired communication signals 121 may include, without limitation, an incoming page signal.

In the preferred embodiment of the present invention, the one of the plurality of distinctive tactile alert patterns 301–312 is determined by a user of the radiotelephone 101. This determination can be made by the user through the keypad 217 of the radiotelephone 101. Thus, the present invention permits the user to select a distinctive tactile alert pattern based on the user's preference. The user's preference may be influenced by a number of variables including the user's physiology, clothing, and location of the radiotelephone on the user's body. Further, the user may program the radiotelephone 101 to selected distinctive tactile alert patterns 301–312 to be generated when a selected corresponding phone numbers are received by the radiotelephone 101.

Alternatively, the one of the plurality of distinctive tactile alert patterns 301–312 is determined by the radiotelephone system 102 in which the radiotelephone 101 operates. When the radiotelephone system 102 transmits the desired communication signal 121 to the radiotelephone 101, the desired communication signal 121 further comprises a code corresponding to the one of the plurality of distinctive tactile alert patterns 301–312 to be generated. Thus, the radiotelephone system 102 may cause the radiotelephone 101 to generate the distinctive tactile alert patterns 301–312. For example, the radiotelephone system 102 may cause one of the particular distinctive tactile alert patterns 301–312 to be generated when the desired communication signal 121 is an incoming telephone call signal and another one of the particular distinctive tactile alert patterns 301–312 to be generated when the desired communication signal 121 is a incoming page call signal. As another example, the radiotelephone system 102 may cause one of the particular distinctive tactile alert patterns 301–312 to be generated when the desired communication signal 121 is an incoming telephone call signal within one radiotelephone system and another one of the particular distinctive tactile alert patterns 301–312 to be generated when the desired communication signal 121 is an incoming telephone call signal within another radiotelephone system.

In the preferred embodiment of the present invention, the plurality of distinctive tactile alert patterns 301–312 are made distinctive from each other by varying at least one of duty cycle and frequency of each of the plurality of distinctive tactile alert patterns. Such variation is illustrated in FIG. 3 by the variety of distinctive tactile alert patterns 301–312. Further, the intensity of the distinctive tactile alert patterns may also be varied if so desired.

FIG. 4 is a timing diagram illustrating a distinctive audible or visual alert pattern 401 and the distinctive tactile alert pattern 301 in accordance with the present invention. A high value signifies that the tactile generator 223 is "on", and a low value signifies that the tactile alert generator 233 is "off".

In the preferred embodiment of the present invention, the audible alert generator 225 generates an audible alert pattern 401. The controller 215, operably coupled to the receiver 205 and the audible alert generator 225, enables the audible alert generator 225 to generate the audible alert pattern 401 as one of a plurality of distinctive audible alert patterns when the desired communication signal 121 is received. The one of the plurality of distinctive audible alert patterns 401 and the one of the plurality of distinctive tactile alert patterns 301 have substantially the same distinctive alert pattern. For example, the ringer 225 and the vibrator 223 both produce substantially the same distinctive alert pattern. Thus, the user is alerted to the desired communication signal 121 with the same distinctive alert pattern recognized by the user no matter whether the user is alerted by the ringer 225 or the vibrator 223.

Alternatively, the visual alert generator 221 generates a visual alert pattern 401. The controller 215, operably coupled to the receiver 205 and the visual alert generator 221, enables the visual alert generator 221 to generate the visual alert pattern 401 as one of a plurality of distinctive visual alert patterns when the desired communication signal 121 is received. The one of the plurality of distinctive visual alert patterns 401 and the one of the plurality of distinctive tactile alert patterns 301 have substantially the same distinctive alert pattern.

Alternatively, the receiver receives the desired communication signal 121. The audible alert generator 225 generates an audible alert pattern 401 when enabled. The silent alert generator 227 for generating a silent alert pattern 301 when enabled. The controller 215, operably coupled to the receiver 215, the audible alert generator 225 and the silent alert generator 227, enables at least one of the audible alert generator 225 and the silent alert generator 227 when the desired communication signal 121 is received. The audible alert generator 225 generates the audible alert pattern 401 as one of a plurality of distinctive audible alerts and the silent alert generator 227 generates the silent alert pattern 301 as one of a plurality of distinctive silent alerts 301–312. The one of the plurality of distinctive audible alert patterns 401 and the one of the plurality of distinctive silent alert patterns 301 have substantially the same distinctive alert pattern. In the preferred embodiment of the present invention, the audible alert generator 225 is a ringer 225 and the silent alert generator 227 is a vibrator 223. Alternatively, the silent alert generator 227 may be a display 221.

Thus, a wireless communication device 101 is adapted to generate a plurality of distinctive vibrating alert patterns. The controller 215, operably coupled to the receiver 205 and the vibrating alert generator 223, enables the vibrating alert generator 223 to generate the vibrating alert pattern 301 as one of a plurality of distinctive vibrating alert patterns 301–312 when the desired communication signal 121 is received. The present invention advantageously permits the user or the communication system to select a preferred distinctive tactile alert pattern (301), or to assign a particular distinctive vibrating alert pattern (301) to a particular desired communication signal (121).

What is claimed is:

1. A wireless communication device comprising:
   a receiver, for receiving a desired communication signal;
   a tactile alert generator, for generating a tactile alert pattern when enabled;
   an audible alert generator, for generating an audible alert pattern; and
   a controller, coupled to the receiver, the tactile alert generator, and the audible alert generator, for enabling the tactile alert generator to generate a particular tactile alert pattern as one of a plurality of distinctive tactile alert patterns when a particular desired communication signal is received, wherein different particular tactile alert patterns are generated when different corresponding particular desired communication signals are received, and for enabling the audible alert generator to generate the audible alert pattern as one of a plurality of distinctive audible alert patterns when the desired communication signal is received,
   wherein the one of the plurality of distinctive audible alert patterns and the one of the plurality of distinctive tactile alert patterns have substantially the same distinctive alert pattern.

2. A wireless communication device comprising:
   a receiver, for receiving a desired communication signal;
   a tactile alert generator, for generating a tactile alert pattern when enabled;
   a visual alert generator, for generating a visual alert pattern;
   a controller, operably coupled to the receiver, the tactile alert generator, and the visual alert generator, for enabling the tactile alert generator to generate a particular tactile alert pattern as one of a plurality of distinctive tactile alert patterns when a particular desired communication signal is received, wherein different particular tactile alert patterns are generated when different corresponding particular desired communication signals are received and for enabling the visual alert generator to generate the visual alert pattern as one of a plurality of distinctive visual alert patterns when the desired communication signal is received,
   wherein the one of the plurality of distinctive visual alert patterns and the one of the plurality of distinctive tactile alert patterns have substantially the same distinctive alert pattern.

* * * * *